United States Patent
Noda et al.

(10) Patent No.: US 11,982,199 B2
(45) Date of Patent: May 14, 2024

(54) TURBOCHARGER

(71) Applicant: MITSUBISHI HEAVY INDUSTRIES ENGINE & TURBOCHARGER, LTD., Sagamihara (JP)

(72) Inventors: Yoshitomo Noda, Tokyo (JP); Takuya Arakawa, Tokyo (JP); Yosuke Dammoto, Sagamihara (JP); Shuichi Isayama, Tokyo (JP); Hiroaki Takeuchi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/796,497

(22) PCT Filed: Feb. 20, 2020

(86) PCT No.: PCT/JP2020/006878
§ 371 (c)(1),
(2) Date: Jul. 29, 2022

(87) PCT Pub. No.: WO2021/166180
PCT Pub. Date: Aug. 26, 2021

(65) Prior Publication Data
US 2023/0053136 A1 Feb. 16, 2023

(51) Int. Cl.
*F01D 25/16* (2006.01)
*F01D 25/18* (2006.01)
*F02C 6/12* (2006.01)

(52) U.S. Cl.
CPC ........... *F01D 25/164* (2013.01); *F01D 25/18* (2013.01); *F02C 6/12* (2013.01); *F05D 2220/40* (2013.01);
(Continued)

(58) Field of Classification Search
CPC ...... F01D 25/164; F01D 25/18; F01D 25/162; F02C 6/12; F05D 2220/40; F05D 2240/54;
(Continued)

(56) References Cited

U.S. PATENT DOCUMENTS

| | | | | |
|---|---|---|---|---|
| 4,859,090 A | * | 8/1989 | Smith | .............. F16C 25/083 384/522 |
| 8,961,128 B2 | | 2/2015 | Mavrosakis et al. | |

(Continued)

FOREIGN PATENT DOCUMENTS

| | | |
|---|---|---|
| JP | 60-43137 U | 3/1985 |
| JP | 1-127939 U | 8/1989 |

(Continued)

OTHER PUBLICATIONS

International Preliminary Report on Patentability and Written Opinion of the International Searching Authority for International Application No. PCT/JP2020/006878, dated Sep. 1, 2022, with an English translation.

(Continued)

*Primary Examiner* — Yi-Kai Wang
(74) *Attorney, Agent, or Firm* — BIRCH, STEWART, KOLASCH & BIRCH, LLP (57) ABSTRACT

A turbocharger is provided with: a rotational shaft; a rolling bearing rotatably supporting the rotational shaft; an oil film damper disposed radially outward of an outer ring of the rolling bearing; and a housing having a first axial retaining portion and a second axial retaining portion, disposed adjacent to both ends of the oil film damper in the axial direction, respectively, for restricting movement of the outer ring in the axial direction. An axial end surface of the outer ring, or a facing surface of the first axial retaining portion or the second axial retaining portion facing the axial end surface of (Continued)

the outer ring has: a coefficient of static friction smaller than that of a portion of the housing excluding the first axial retaining portion and the second axial retaining portion; or has a recess where oil of the oil film damper can enter.

12 Claims, 9 Drawing Sheets

(52) U.S. Cl.
CPC ...... *F05D 2240/54* (2013.01); *F05D 2260/96* (2013.01); *F05D 2260/98* (2013.01)

(58) Field of Classification Search
CPC ............. F05D 2260/96; F05D 2260/98; F05D 2240/52; F02B 39/14; F02B 37/00
USPC ........................................................ 415/229
See application file for complete search history.

(56) References Cited

U.S. PATENT DOCUMENTS

| | | | |
|---|---|---|---|
| 2013/0224015 A1 | 8/2013 | Berruet et al. | |
| 2014/0079572 A1 | 3/2014 | Iwata et al. | |
| 2014/0341729 A1 | 11/2014 | Osako et al. | |
| 2018/0045242 A1 | 2/2018 | Ozawa | |
| 2018/0245629 A1* | 8/2018 | Takaoka | F16C 35/063 |
| 2019/0186544 A1* | 6/2019 | von Schleinitz | F16C 33/62 |
| 2021/0054879 A1 | 2/2021 | Uneura et al. | |

FOREIGN PATENT DOCUMENTS

| | | | |
|---|---|---|---|
| JP | 2005-172099 A | | 6/2005 |
| JP | 2009-270612 A | | 11/2009 |
| JP | 2014-62557 A | | 4/2014 |
| JP | 2018-25183 A | | 2/2018 |
| JP | 2019-178756 A | | 10/2019 |
| WO | WO-2018070311 A1 | * | 4/2018 |
| WO | WO 2020/021908 A1 | | 1/2020 |

OTHER PUBLICATIONS

International Search Report and Written Opinion of the International Searching Authority for International Application No. PCT/JP2020/006878, dated May 19, 2020.

Japanese Notice of Reasons for Refusal for Japanese Application No. 2022-501523, dated Jul. 18, 2023, with an English translation.

\* cited by examiner

TURBOCHARGER

TECHNICAL FIELD

The present disclosure relates to a turbocharger.

BACKGROUND ART

In a turbocharger using a rolling bearing, oil is injected into a gap between the housing and the outer ring of the rolling bearing, and even when a rotational shaft supported by the rolling bearing vibrates, this oil (oil film damper) has a damping effect on the shaft vibration and suppresses vibration transmitted from the rolling bearing to the housing.

The outer ring of the rolling bearing may be configured to restrict the movement of the rotational shaft in the axial direction. For example, in Patent Document 1, one end portion (compressor-side end portion) of the outer ring is locked by a plate, and the other end portion (turbine-side end portion) of the outer ring is locked by a housing. In Patent Document 2, an anti-rotation member is fitted to one end portion (compressor-side end portion) of the outer ring.

CITATION LIST

Patent Literature

Patent Document 1: U.S. Pat. No. 8,961,128B
Patent Document 2: JP2018-25183A

SUMMARY

Problems to be Solved

However, in the configurations described in Patent Document 1 and Patent Document 2, the larger the axial load acting on the outer ring, the larger the frictional force acting between the outer ring and the plate or the housing. Therefore, when the rotational shaft vibrates, the outer ring cannot move in the radial direction, and the damping effect of the oil film damper on the shaft vibration may not be sufficiently exerted.

The present disclosure was made in view of the above problem, and an object thereof is to provide a turbocharger provided with a rolling bearing that can sufficiently exert the damping effect of the oil film damper on the shaft vibration even when the axial load acting on the outer ring is large.

Solution to the Problems

To achieve the above object, a turbocharger according to the present disclosure comprises: a rotational shaft; a rolling bearing rotatably supporting the rotational shaft; an oil film damper disposed radially outward of an outer ring of the rolling bearing; and a housing having a first axial retaining portion and a second axial retaining portion, disposed adjacent to both ends of the oil film damper in the axial direction, respectively, for restricting movement of the outer ring in an axial direction. An axial end surface of the outer ring, or a facing surface of the first axial retaining portion or the second axial retaining portion facing the axial end surface of the outer ring has: a coefficient of static friction smaller than that of a portion of the housing excluding the first axial retaining portion and the second axial retaining portion; or a recess where oil of the oil film damper can enter.

Advantageous Effects

According to the turbocharger of the present disclosure, since the coefficient of static friction of the axial end surface of the outer ring or the facing surface of the first axial retaining portion or the second axial retaining portion is small, even when the axial load acting on the outer ring is large, the outer ring can be moved in the radial direction upon vibration of the rotational shaft, so that the damping effect of the oil film damper on the shaft vibration can be sufficiently exerted.

DETAILED DESCRIPTION

Hereinafter, a turbocharger according to embodiments of the present disclosure will be described with reference to the drawings. The following embodiments are illustrative and not intended to limit the present disclosure, and various modifications are possible within the scope of technical ideas of the present disclosure.

First Embodiment (Configuration of Turbocharger)

The configuration of a turbocharger according to the first embodiment of the present disclosure will be described. The turbocharger may be, but is not limited to, an exhaust turbocharger for supercharging air to an engine mounted on a vehicle such as an automobile. In the present disclosure, an exhaust turbocharger will be described as an example.

Figure 1:
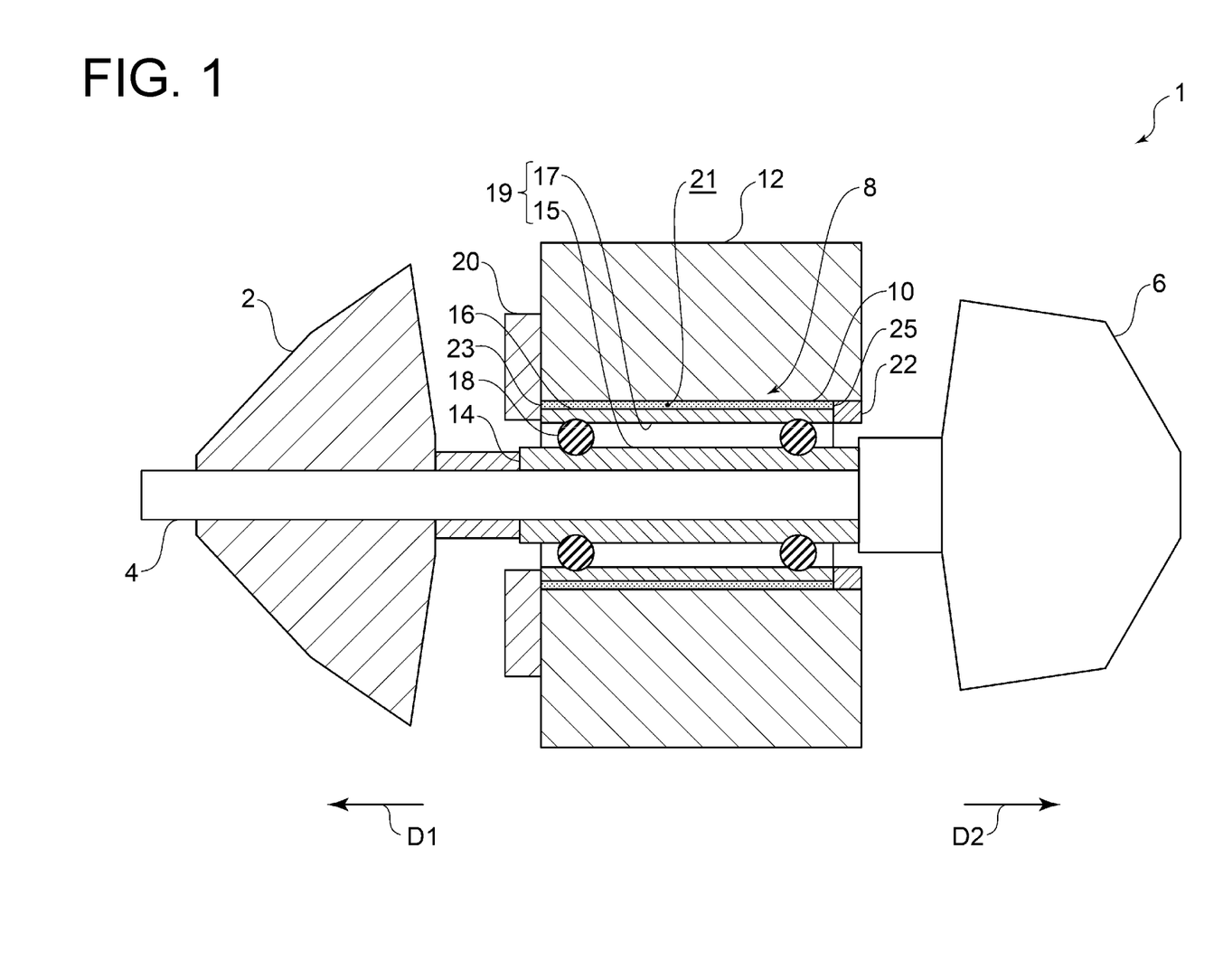
FIG. 1 is a schematic configuration diagram of a turbocharger according to the first embodiment of the present invention.

As shown in FIG. 1, a turbocharger 1 includes a compressor 2 for compressing intake air and supplying it to an engine (not show). The compressor 2 is connected to a turbine 6 by a rotational shaft 4 and is driven in conjunction with the turbine 6 which is rotationally driven by exhaust gas discharged from the engine.

Hereinafter, the direction of a circular locus drawn by rotation of the turbine 6 around the rotational shaft 4 be referred to as the "circumferential direction", and the radial direction of the circular locus will be referred to as the "radial direction". Further, the axial direction of the rotational shaft 4 will simply be referred to as a "axial direction". Further, in the axial direction, a direction toward one axial side is referred to as the first axial direction D1, and a direction toward the other axial direction is referred to as the second axial direction D2. In the present embodiment, the compressor 2 is arranged at an end portion of the rotational shaft 4 on the first axial direction D1 side, and the turbine 6 is arranged at an end portion of the rotational shaft 4 on the second axial direction D2 side.

The turbocharger 1 includes, in addition to the compressor 2, the rotational shaft 4, and the turbine 6, a rolling bearing 8, an oil film damper 10, and a housing 12. The rolling bearing 8 and the oil film damper 10 are housed in the housing 12.

The rolling bearing 8 serves to rotatably support the rotational shalt 4. The rolling bearing 8 includes an inner ring 14, an outer ring 16, and a rolling element 18. The inner ring 14 has a cylindrical shape and is fixed to the rotational shaft 4. The inner ring 14 rotates as the rotational shaft 4 rotates. The outer ring 16 has a cylindrical shape and has a larger diameter than the inner ring 14. The outer ring 16 is fitted in the housing 12 and thus supported by the housing 12. The inner ring 14 is arranged inside the outer ring 16, and a raceway surface 19 is formed by an outer peripheral surface 15 of the inner ring 14 and an inner peripheral surface 17 of the outer ring 16. The rolling element 18 rolls on the raceway surface 19, and is, for example, a ball or a roller. A plurality of rolling elements 18 may be provided. In this case, the rolling elements 18 may be held by a cage so that they are not in contact with each other.

The oil film damper 10 is disposed radially outward of the outer ring 16 of the rolling bearing 8 and is placed in a gap 21 formed between the outer ring 16 and the housing 12. The gap 21 is supplied with lubricating oil 11 via, for example, an orifice (not shown) formed in the housing 12. Such an oil film damper 10 has a function of damping the vibration of the rotational shaft 4 caused during the operation of the turbocharger 1.

The housing 12 has a first axial retaining portion 20 and a second axial retaining portion 22. The first axial retaining portion 20 is disposed adjacent to one end 23 of the oil film damper 10 on the first axial direction D1 side in the axial direction and restricts the movement of the outer ring 16 of the rolling bearing 8 in the first axial direction D1. The second axial retaining portion 22 is disposed adjacent to the other end 25 of the oil film damper 10 on the second axial direction D2 side in the axial direction and restricts the movement of the outer ring 16 of the rolling bearing 8 in the second axial direction D2. In the present embodiment, one end 23 of the oil film damper 10 is disposed closer to the compressor 2 than the other end 25. The housing 12 may be integrated with the first axial retaining portion 20 and the second axial retaining portion 22 to form a single component as a whole. Alternatively, each of the first axial retaining portion 20 and the second axial retaining portion 22 may be made of a different material from a portion of the housing 12 excluding the first axial retaining portion 20 and the second axial retaining portion 22.

Further, the first axial retaining portion 20 may be configured to be able to prevent the outer ring 16 from rotating in the circumferential direction. For example, although not depicted, the first axial retaining portion 20 may include a pin member protruding toward the outer ring 16, and the outer ring 16 may have a fitting hole into which the pin member is fitted.

Figure 2:
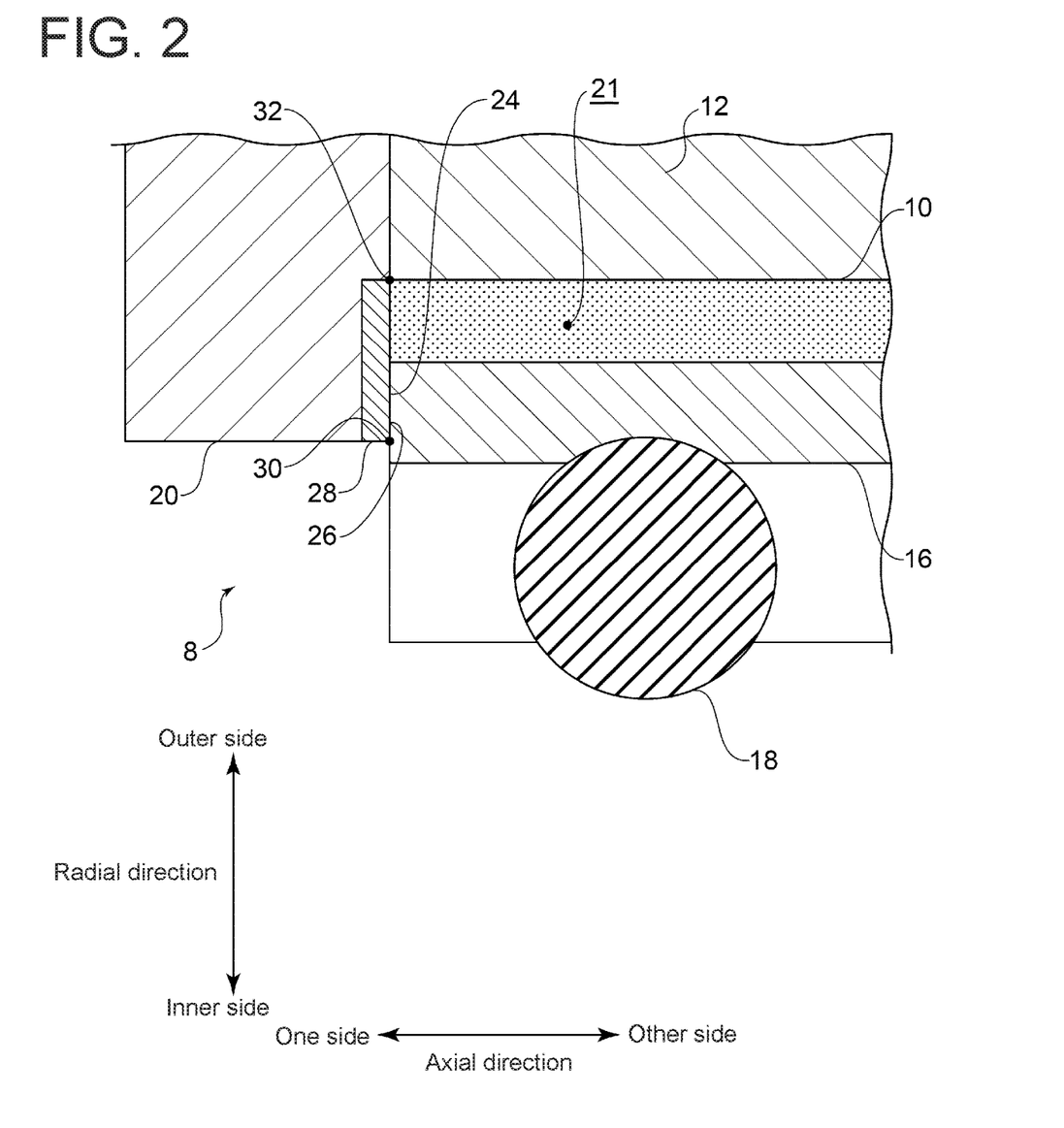
FIG. 2 is a schematic configuration diagram of a first axial retaining portion according to the first embodiment of the present invention.

With reference to FIG. 2, the configuration of the first axial retaining portion 20 will be described. A facing surface 26 of the first axial retaining portion 20 faces an end surface 24 of the outer ring 16 on one side in the axial direction. This facing surface 26 has a coefficient of static friction $\mu$ smaller than that of the portion of the housing 12 excluding the first axial retaining portion 20 and the second axial retaining portion 22. The coefficient of static friction u of the facing surface 26 is a value measured by the test method in accordance with JIS K 7125, for example.

In the first embodiment, as shown in FIG. 2, the first axial retaining portion 20 has a coating film 28 which forms the facing surface 26 so that the facing surface 26 has the coefficient of static friction $\mu$. This coating film 28 may contain amorphous carbon, molybdenum disulfide, carbon nitride, phosphate, nickel phosphorus, silver, gold, or fluororesin. Further, the coating film 28 (the facing surface 26 having the coefficient of static friction $\mu$) may extend in the radial direction from a radially inner end 30 of the first axial retaining portion 20 to a radially outer end 32 of the oil film damper 10.

(Operation and Effect)

Figure 3:
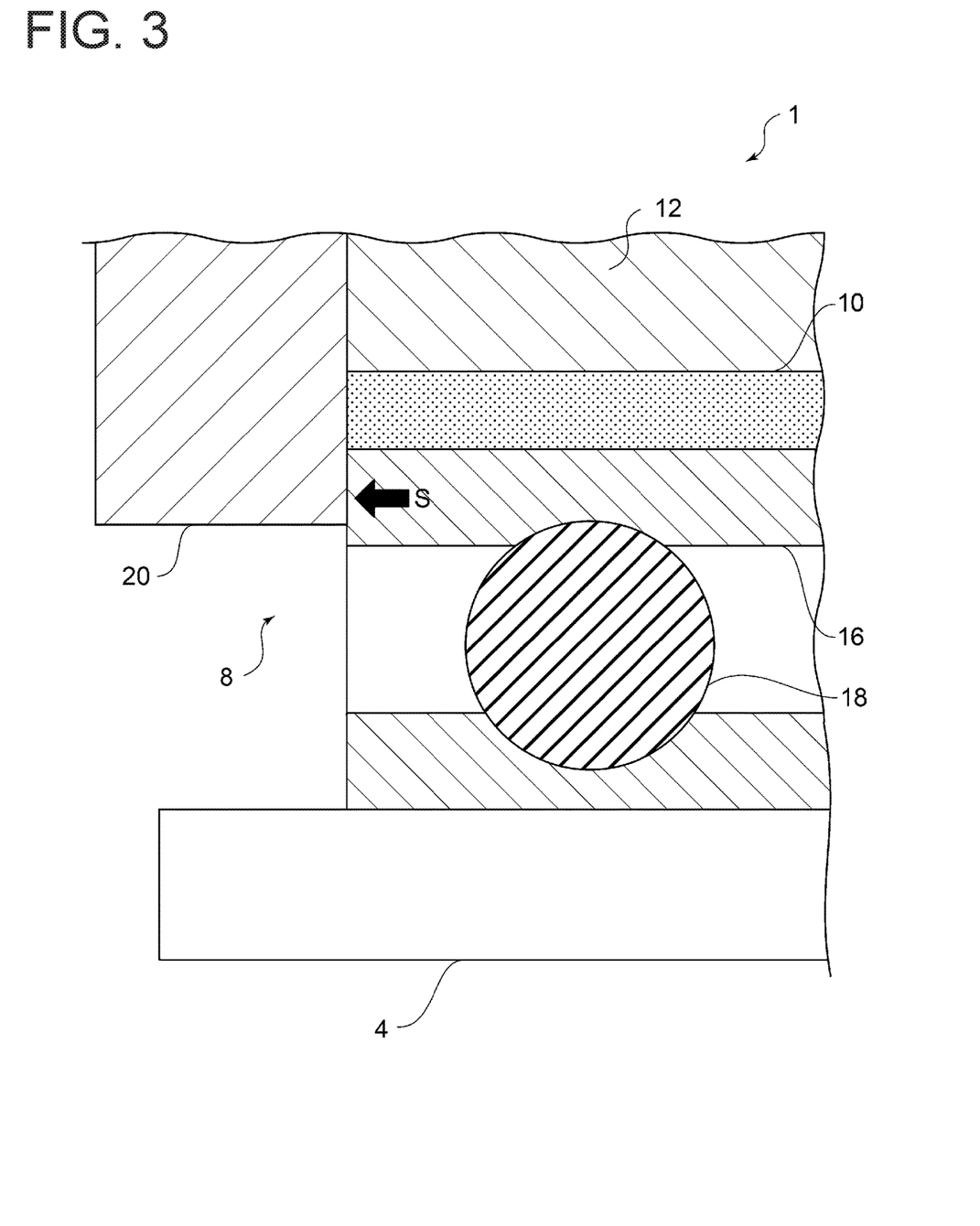
FIG. 3 is a diagram of a comparative example of a rolling bearing.

The operation and effect of the turbocharger 1 according to the first embodiment of the present disclosure will be described. As shown in the comparative example of FIG. 3, in the turbocharger 1 using the rolling bearing 8, thrust load S is applied from the outer ring 16 to the plate (first axial retaining portion 20). If the thrust load S is large, even when the rotational shaft 4 vibrates, the outer ring 16 does not move in the radial direction or moves little due to the frictional force acting between the outer ring 16 and the first axial retaining portion 20. As a result, the oil film damper 10 may not sufficiently exhibit the vibration damping function.

However, according to the first embodiment, the coating film 28 forms the facing surface 26 of the first axial retaining portion 20 so that the coefficient of static friction p, of the facing surface 26 of the first axial retaining portion 20 is smaller than that of the portion of the housing 12 excluding the first axial retaining portion 20 and the second axial retaining portion 22. Thus, even if the thrust load S acting on the outer ring 16 is large, when the rotational shaft 4 vibrates, the frictional force acting between the outer ring 16 and the first axial retaining portion 20 is reduced, so that the outer ring 16 can be moved outward in the radial direction. Therefore, the damping effect of the oil film damper 10 on the shaft vibration of the rotational shaft 4 can be sufficiently exerted. Additionally, although vibration is transmitted from the rolling bearing 8 to the housing 12 during the operation of the turbocharger 1, this vibration can be suppressed. According to the first embodiment, when the rotational shaft 4 vibrates, the outer ring 16 can also be moved inward in the radial direction.

Further, according to the first embodiment, the coating film 28 having the coefficient of static friction u extends in the radial direction from the radially inner end 30 of the first axial retaining portion 20 to the radially outer end 32 of the oil film damper 10. Thus, when the outer ring 16 moves in the radial direction relative to the housing 12 within the range allowed by the gap 21 of the oil film damper 10, the effect of reducing the frictional force between the first axial retaining portion 20 and the outer ring 16 can be enjoyed from the radially inner end 30 of the first axial retaining portion 20 to the radially outer end 32 of the oil film damper 10.

Further, according to the first embodiment, since it is relatively easy to form the coating film 28 on the facing surface 26 of the first axial retaining portion 20, the damping effect of the oil film damper 10 on the shaft vibration of the rotational shall 4 can be easily improved.

In the first embodiment, the coefficient of static friction $\mu$ of the facing surface 26 of the first axial retaining portion 20 is smaller than that of the portion of the housing 12 excluding the first axial retaining portion 20 and the second axial retaining portion 22, but the present disclosure is not limited to this embodiment. In some embodiments, the coefficient of static friction of a facing surface of the second axial retaining portion 22 (a surface facing an end surface of the outer ring 16 on the other side in the axial direction) may be smaller than that of the portion of the housing 12 excluding the first axial retaining portion 20 and the second axial retaining portion 22.

Second Embodiment

Figure 4:
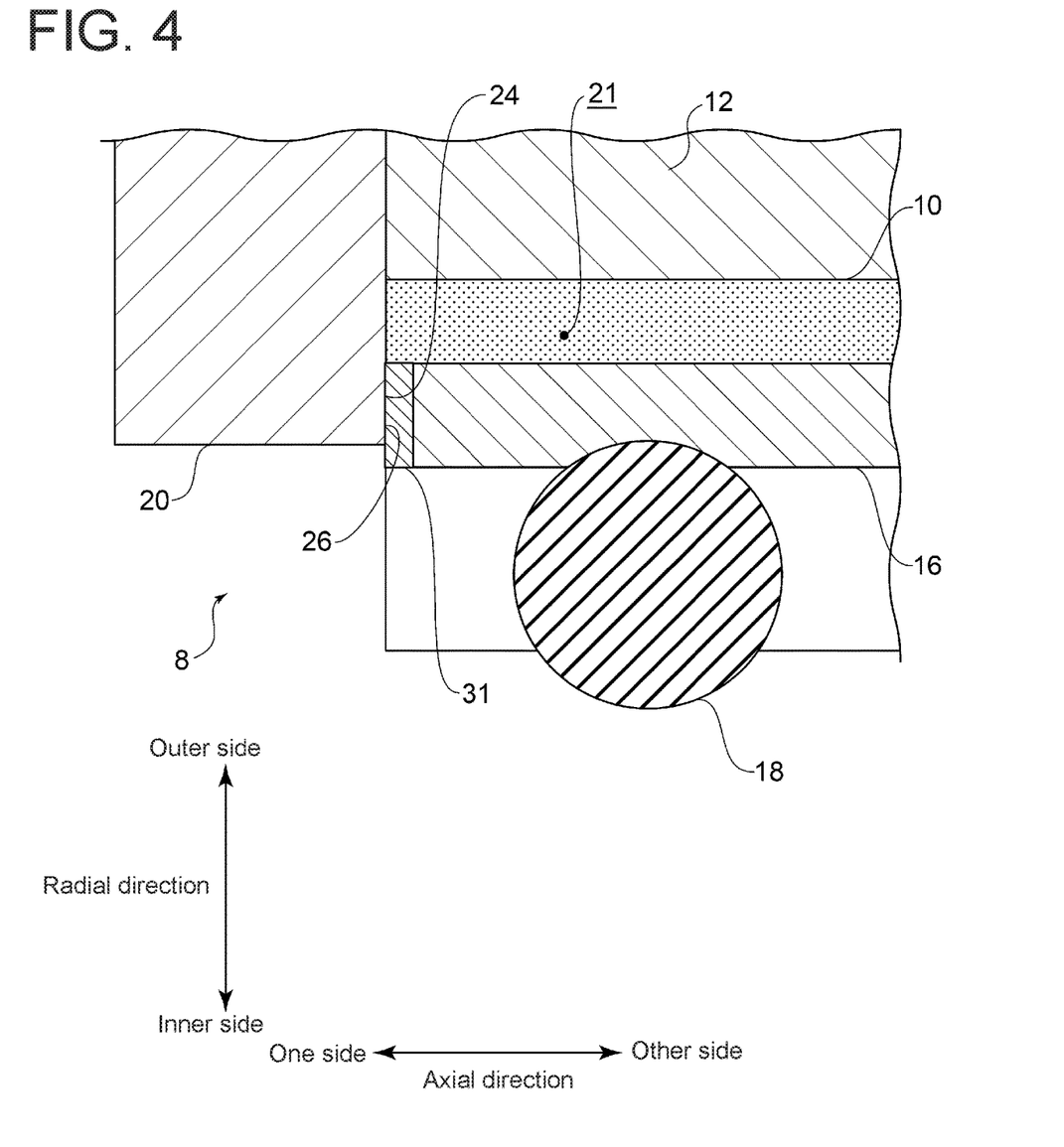
FIG. 4 is a schematic configuration diagram of an outer ring according to the second embodiment of the present invention.

The turbocharger 1 according to the second embodiment of the present disclosure will be described. The second embodiment is different from the first embodiment in that a coating film 31 is formed on the end surface 24 of the outer ring 16 on one side in the axial direction instead of the facing surface 26 of the first axial retaining portion 20, but the other configurations are the same as those described in the first embodiment. In the second embodiment, the same constituent elements as those in the first embodiment are associated with the same reference characters and thus not described again in detail.

As shown in FIG. 4, the outer ring 16 has a coating film 31 which forms the end surface 24 on one side in the axial direction. This coating film 31 is the same as the coating film 28 described in the first embodiment. Thus, the second embodiment is configured such that the end surface 24 of the outer ring 16 on one side in the axial direction has the coefficient of static friction $\mu$. Further, the end surface 24 of the outer ring 16 on one side in the axial direction may have the coefficient of static friction $\mu$ in the entire region. That is, the coating film 31 may be formed over the entire region of the end surface 24 of the outer ring 16 on one side in the axial direction.

According to the second embodiment, the coating film 28 forms the end surface 24 of the outer ring 16 on one side in the axial direction so that the end surface 24 of the outer ring 16 on one side in the axial direction has a coefficient of static friction $\mu$ smaller than that of the portion of the housing 12 excluding the first axial retaining portion 20 and the second axial retaining portion Thus, even if the thrust load S acting on the outer ring 16 is large, when the rotational shaft 4 vibrates, the frictional force acting between the outer ring 16 and the first axial retaining portion 20 is reduced, so that the outer ring 16 can be moved outward in the radial direction. Therefore, the damping effect of the oil film damper 10 on the shaft vibration of the rotational shaft 4 can be sufficiently exerted.

Further, according to the second embodiment, the coating film 31 having the coefficient of static friction $\mu$ forms the entire region of the end surface 24 of the outer ring 16 on one side in the axial direction. Thus, when the outer ring 16 moves in the radial direction relative to the housing 12 within the range allowed by the gap 21 of the oil film damper 10, the effect of reducing the frictional force between the first axial retaining portion 20 and the outer ring 16 can be enjoyed over the entire movement range of the outer ring 16 in the radial direction.

Further, according to the second embodiment, since it is relatively easy to form the coating film 31 on the end surface 24 of the outer ring 16 on one side in the axial direction, the damping effect of the oil film damper 10 on the shaft vibration of the rotational shaft 4 can be easily improved.

In the second embodiment, the end surface 24 of the outer ring 16 on one side in the axial direction has a smaller coefficient of static friction $\mu$ than that of the portion of the housing 12 excluding the first axial retaining portion 20 and the second axial retaining portion 22, but the present disclosure is not limited to this embodiment. In some embodiments, the end surface of the outer ring 16 on the other side in the axial direction may have a coefficient of static friction $\mu$ smaller than that of the portion of the housing 12 excluding the first axial retaining portion 20 and the second axial retaining portion 22.

Third Embodiment

The turbocharger 1 according to the third embodiment of the present disclosure will be described. In the third embodiment, the facing surface 26 of the first axial retaining portion 20 has the coefficient of static friction $\mu$ with a configuration different from the first embodiment. The third embodiment is different from the first embodiment in that the material of the first axial retaining portion 20 is limited, but the other configurations are the same as those described in the first embodiment. In the third embodiment, the same constituent elements as those in the first embodiment are associated with the same reference characters and thus not described again in detail.

Figure 5:
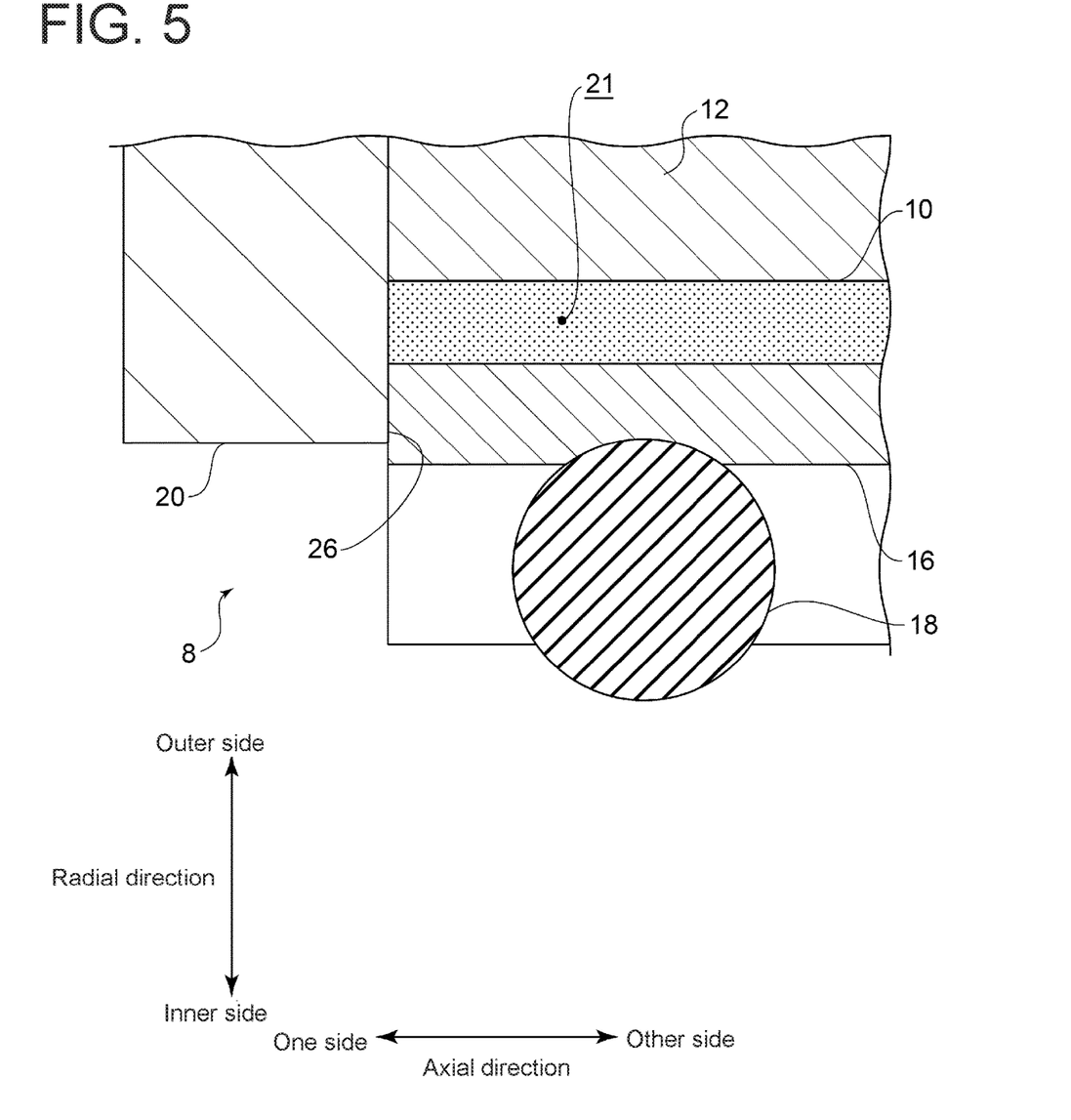
FIG. 5 is a schematic configuration diagram of a first axial retaining portion according to the third embodiment of the present invention.

The first axial retaining portion 20 may contain any of copper, silver, gold, lead, sintered oil-impregnated metal, polyether ether ketone, polyimide, or polyphenylene sulfide. In this case, as shown in FIG. 5, the coating film 28 may not be formed on the first axial retaining portion 20. In some embodiments, when the first axial retaining portion 20 contains any of polyether ether ketone, polyimide, or polyphenylene sulfide, the first axial retaining portion 20 may be impregnated with a solid lubricant. Examples of the solid lubricant include molybdenum disulfide, graphite, and tungsten disulfide.

According to the third embodiment, since the first axial retaining portion 20 contains any of copper, silver, gold, lead, sintered oil-impregnated metal, polyether ether ketone, polyimide, or polyphenylene sulfide, it is possible to reduce the frictional force acting between the end surface 24 of the outer ring 16 on one side in the axial direction and the facing surface 26 of the first axial retaining portion 20, Further, according to the third embodiment, it is possible to omit the step of forming the coaling film 28 on the first axial retaining portion 20.

In the third embodiment, the first axial retaining portion 20 contains any of copper, silver, gold, lead, sintered oil-impregnated metal, polyether ether ketone, polyimide, air polyphenylene sulfide, but the present disclosure is not limited to this embodiment. In some embodiments, the second axial retaining portion 22 may contain any of copper, silver, gold, lead, sintered oil-impregnated metal, polyether ether ketone, polyimide, or polyphenylene sulfide. Further, in some embodiments, the second axial retaining portion 22 may contain any of copper, silver, gold, lead, sintered oil-impregnated metal, polyether ether ketone, polyimide, or polyphenylene sulfide and may have a higher heat resistance than the first axial retaining portion 20. For example, the first axial retaining portion 20 (disposed on the compressor 2 side) has heat resistance up to 200 degrees, while the second axial retaining portion (disposed on the turbine 6 side) has heat resistance up to 300 degrees.

Modification of Third Embodiment

Figure 6:
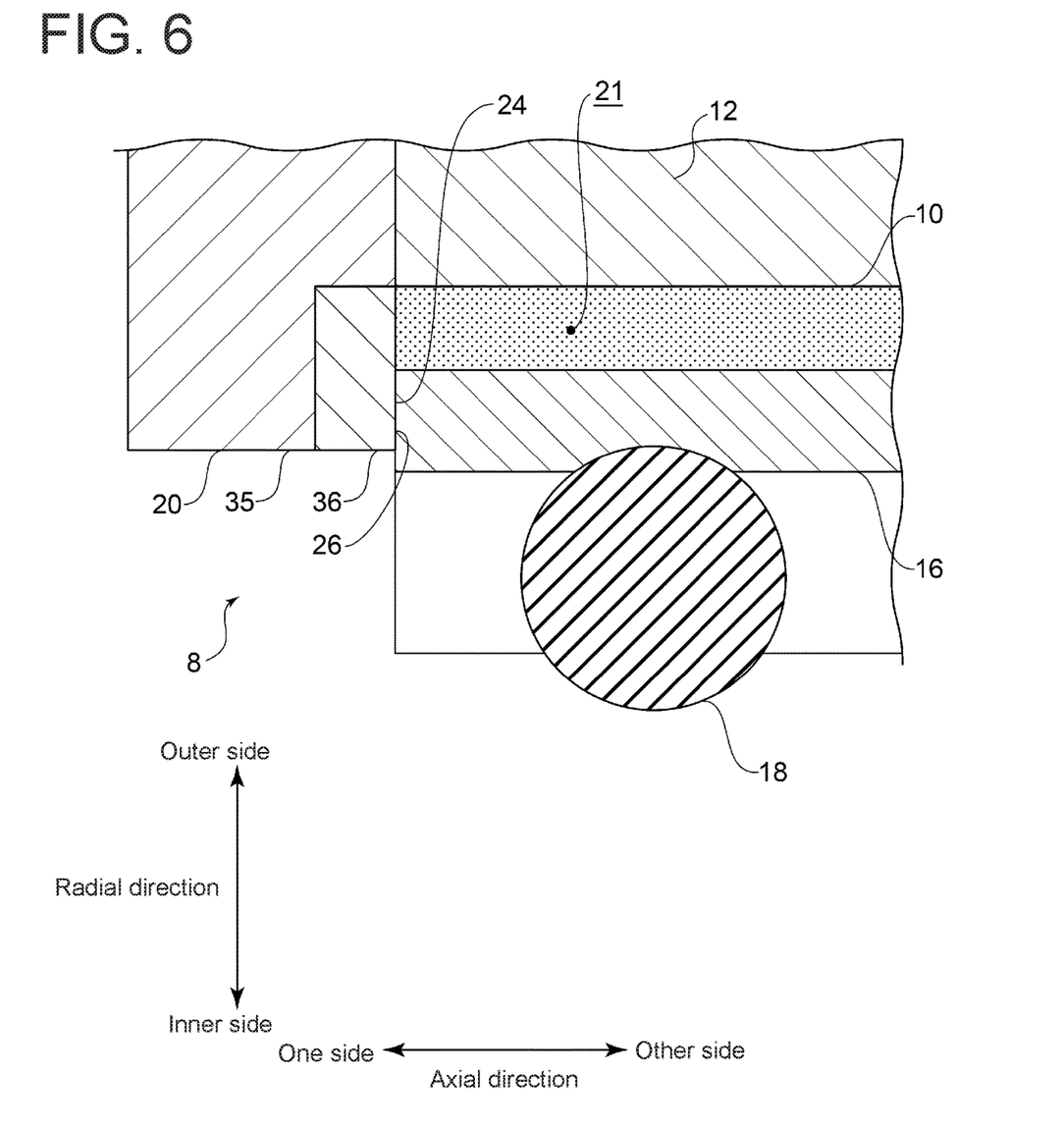
FIG. 6 is a schematic configuration diagram of a first axial retaining portion according to a modification of the third embodiment of the present invention.

As shown in FIG. 6, the first axial retaining portion 20 may include a base portion 35 and an intermediate member 36. Although the base portion 35 is not particularly limited, the intermediate member 36 contains any of copper, silver, gold, lead, sintered oil-impregnated metal, polyether ether ketone, polyimide, or polyphenylene sulfide. Further, the intermediate member 36 is disposed so as to have a facing surface 26 facing the end surface 24 of the outer ring 16 on one side in the axial direction. The intermediate member 36 may have a ring shape, and may be, for example, a resin ring. According to this configuration, since it is very easy to provide the intermediate member 36, the damping effect of the oil film damper 10 on the shaft vibration of the rotational shaft 4 can be very easily improved. Although not depicted, the intermediate member 36 may be arranged so that the radially outer end surface of the intermediate member 36 is disposed radially inward of the radially outer end 32 of the oil film damper 10.

Fourth Embodiment

Figure 7A:
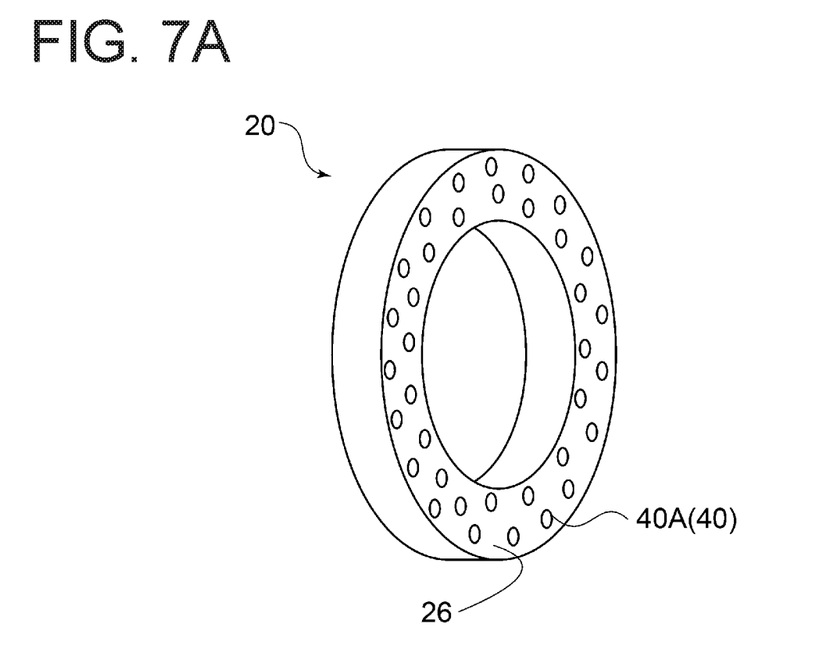
FIG. 7A is a schematic configuration diagram of a recess according to the fourth embodiment of the present invention.

The turbocharger 1 according to the fourth embodiment of the present disclosure will be described. The fourth embodiment is different from the first embodiment in that the coating film 28 is not formed and the facing surface 26 of the first axial retaining portion 20 has a recess 40 (dimple 40A), but the other configurations are the same as those described in the first embodiment. In the fourth embodiment, the same constituent elements as those in the first embodiment are associated with the same reference characters and thus not described again in detail.

As shown in FIG. 7A, the facing surface 26 of the first axial retaining portion 20 has a recess 40 where oil of the oil film damper 10 can enter. In the fourth embodiment, the recess 40 includes a dimple 40A (40) recessed from the facing surface 26 of the first axial retaining portion 20, In the fourth embodiment, a plurality of dimples 40A are arranged over the entire circumferential range of the facing surface 26 of the first axial retaining portion 20. Further, the plurality of dimples 40A are arranged over the entire radial range of the facing surface 26 of the first axial retaining portion 20.

Figure 7B:
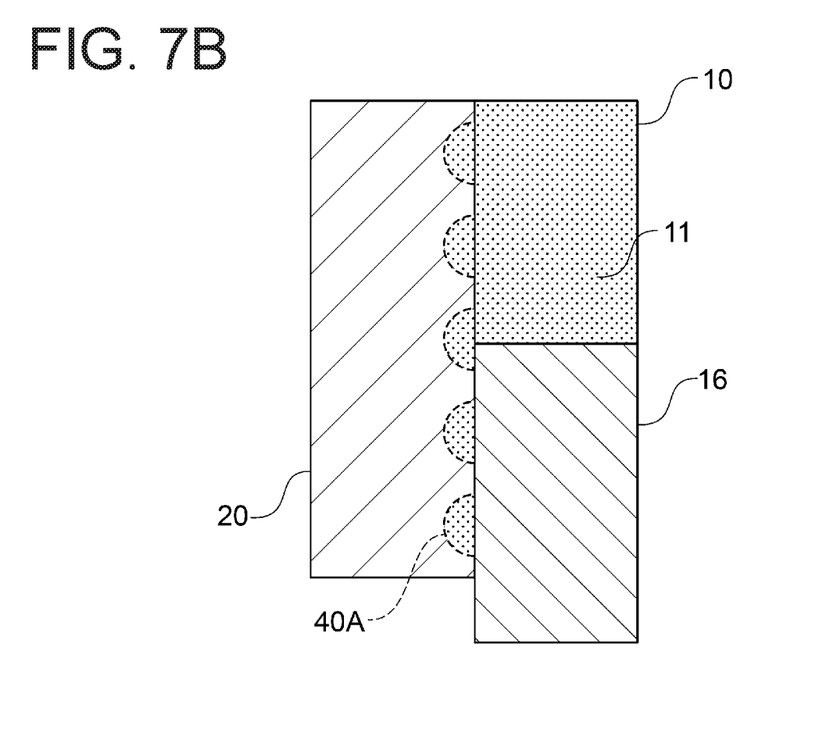
FIG. 7B is a diagram for describing the operation and effect of the recess according to the fourth embodiment of the present invention.

According to the fourth embodiment, as shown in FIG. 7B, the lubricating oil 11 supplied from the oil film damper 10 can be held in the dimples 40A included in the facing surface 26 of the first axial retaining portion 20. As a result, it is possible to reduce the coefficient of friction of the facing surface 26 of the first axial retaining portion 20.

Fifth Embodiment

Figure 8A:
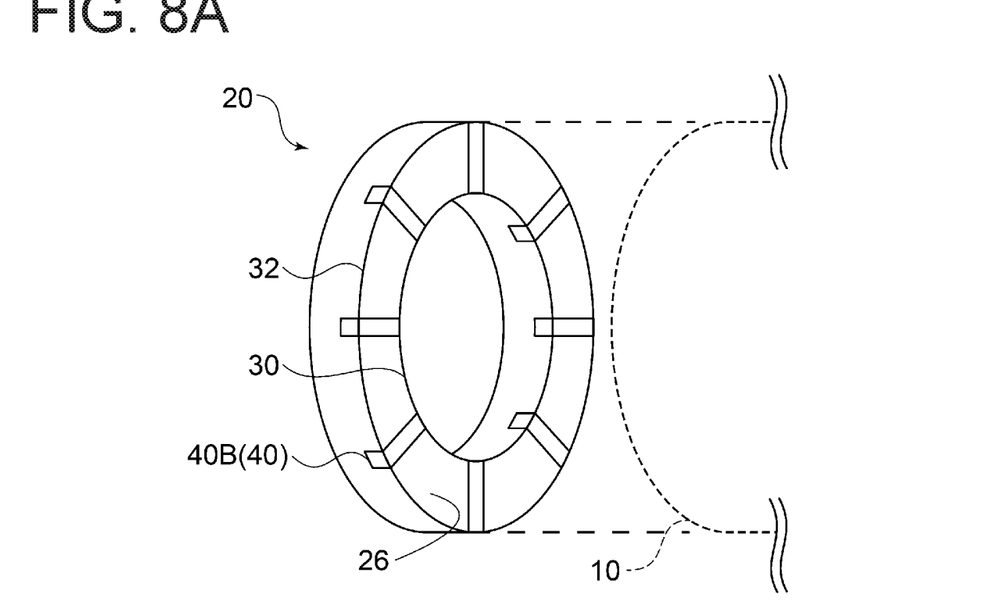
FIG. 8A is a schematic configuration diagram of a recess according to the fifth embodiment of the present invention.

The turbocharger 1 according to the fifth embodiment of the present disclosure will be described. The fifth embodiment is different from the fourth embodiment in that the recess 40 formed in the facing surface 26 of the first axial retaining portion 20 includes a first groove 40B instead of the dimple 40A, but the other configurations are the same as those described in the fourth embodiment. In the fifth embodiment, the same constituent elements as those in the fourth embodiment are associated with the same reference characters and thus not described again in detail.

As shown in FIG. 8A, the recess 40 includes a plurality of first grooves 40B (40) extending in the radial direction from the radially outer end 32 of the oil film damper 10 to the radially inner end 30 of the first axial retaining portion 20. In the fifth embodiment, the plurality of first grooves 40B are arranged along the circumferential direction of the facing surface 26 of the first axial retaining portion 20.

Figure 8B:
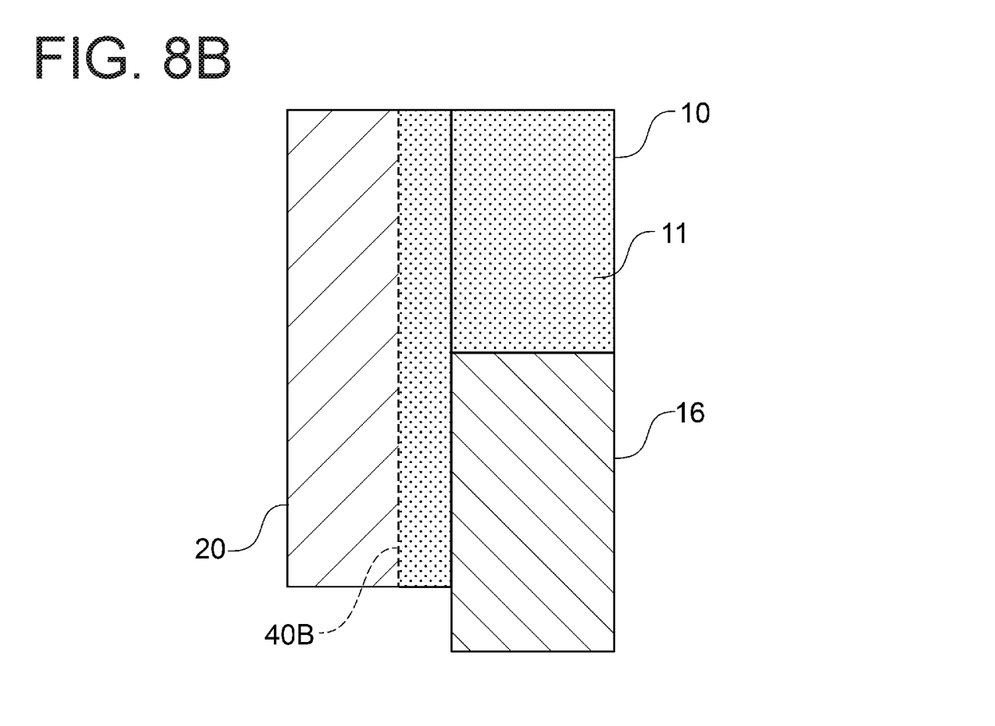
FIG. 8B is a diagram for describing the operation and effect of the recess according to the fifth embodiment of the present invention.

According to the fifth embodiment, as shown in FIG. 8B, since the facing surface 26 of the first axial retaining portion 20 includes the plurality of first grooves 40B, the lubricating oil 11 supplied from the oil film damper 10 can flow into the first grooves 40B, and the facing surface 26 of the first axial retaining portion 20 can be further wetted with the lubricating oil 11. As a result, it is possible to reduce the coefficient of friction of the facing surface 26 of the first axial retaining portion 20.

Sixth Embodiment

Figure 9A:
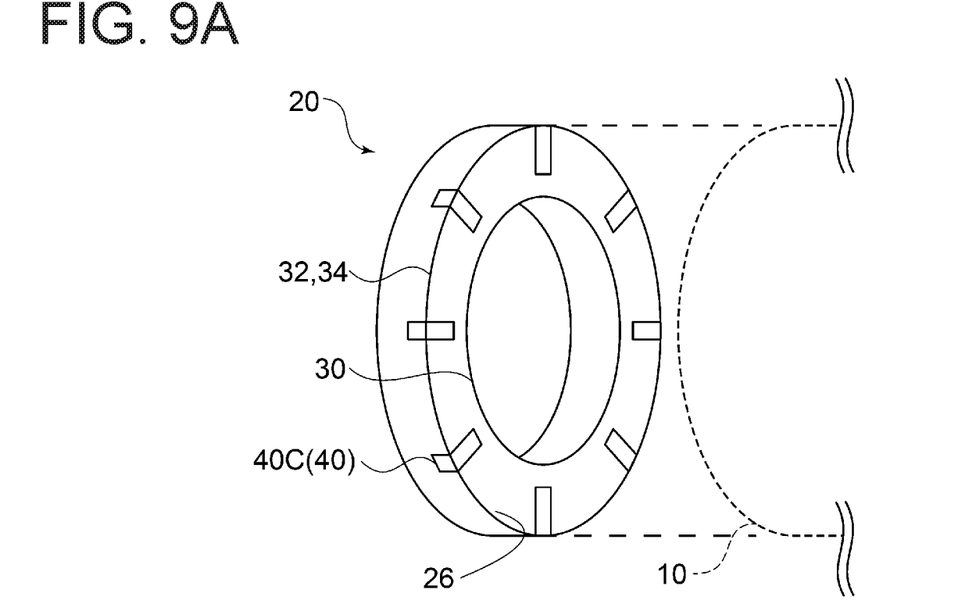
FIG. 9A is a schematic configuration diagram of a recess according to the sixth embodiment of the present invention.

The turbocharger 1 according to the sixth embodiment of the present disclosure will be described. The sixth embodiment is different from the fourth embodiment in that the recess 40 formed in the facing surface 26 of the first axial retaining portion 20 includes a second groove 40C instead of the dimple 40A, but the other configurations are the same as those described in the fourth embodiment. In the sixth embodiment, the same constituent elements as those in the fourth embodiment are associated with the same reference characters and thus not described again in detail.

As shown in FIG. 9A, the recess 40 includes a plurality of second grooves 40C (40) extending in the radial direction from the radially outer end 32 of the oil film damper 10 to a position between the radially outer end 34 and the radially inner end 30 of the first axial retaining portion 20. In the sixth embodiment, the plurality of second grooves 40C are arranged along the circumferential direction of the facing surface 26 of the first axial retaining portion 20.

Figure 9B:
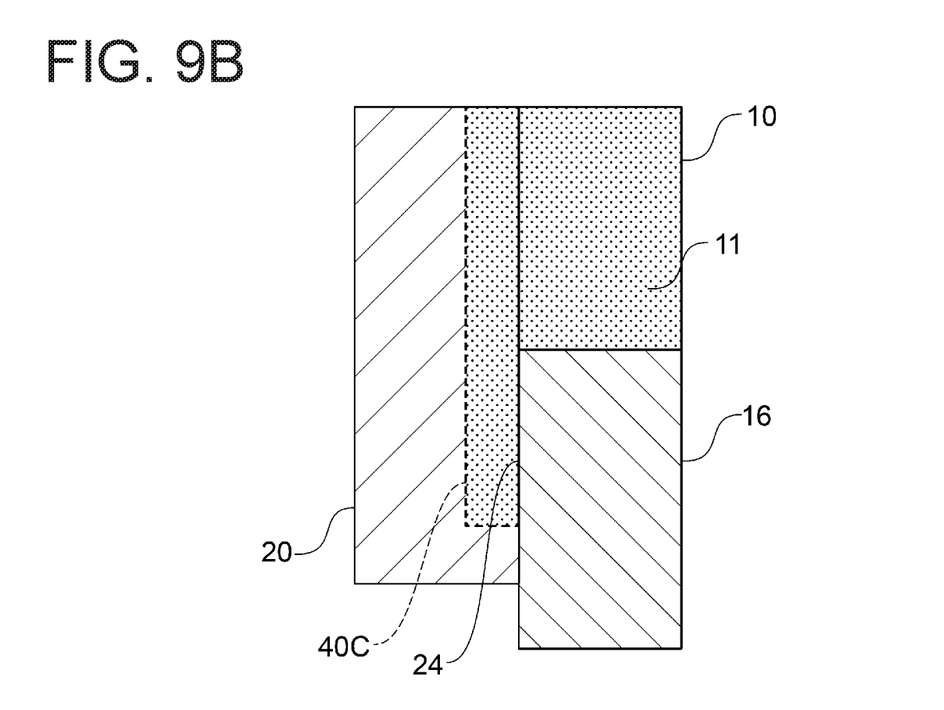
FIG. 9B is a diagram for describing the operation and effect of the recess according to the sixth embodiment of the present invention.

According to the sixth embodiment, as shown in FIG. 9B, since the facing surface 26 of the first axial retaining portion 20 includes the plurality of second grooves 40C, the lubricating oil 11 supplied from the oil film damper 10 can flow into the second grooves 40C, and the lubricating oil 11 can press the end surface 24 of the outer ring 16 on one side in the axial direction to reduce the thrust load S acting on the outer ring 16.

In the fifth embodiment, since the first groove 40B extends to the radially inner end 30 of the first axial retaining portion 20, the lubricating oil 11 may leak. However, in the sixth embodiment, since the second groove 40C extends to a position between the radially outer end 34 and the radially inner end 30 of the first axial retaining portion 20, the lubricating oil 11 is prevented from leaking.

In the fourth to sixth embodiments, the facing surface 26 of the first axial retaining portion 20 has the recess 40 (40A, 40B, 40C). However, the present disclosure is not limited to this embodiment. In some embodiments, the facing surface of the second axial retaining portion 22 may have the recess 40.

The contents described in the above embodiments would be understood as follows, for instance.

(1) A turbocharger (1) according to the present disclosure comprises: a rotational shaft (4); a rolling; hearing (8) rotatably supporting the rotational shaft; an oil film damper (10) disposed radially outward of an outer ring (16) of the rolling bearing; and a housing (12) having a first axial retaining portion (20) and a second axial retaining portion (22) for restricting movement of the outer ring in an axial direction, the first axial retaining portion and the second axial retaining portion being disposed adjacent to both ends of the oil film damper in the axial direction, respectively. An axial end surface (24) of the outer ring, or a facing surface (26) of the first axial retaining portion or the second axial retaining portion facing the axial end surface of the outer ring has: a coefficient of static friction smaller than that of a portion of the housing excluding the first axial retaining portion and the second axial retaining portion; or has a recess where oil of the oil film damper can enter.

According to the above configuration (1), the coefficient of static friction of the axial end surface of the outer ring or the facing surface of the first axial retaining portion or the second axial end surface is smaller than that of the portion of the housing excluding the first axial retaining portion and the second axial retaining portion. Thus, even when the axial load acting on the outer ring is large, the outer ring can be moved in the radial direction upon vibration of the rotational shaft, so that the damping effect of the oil film damper on the shaft vibration can be sufficiently exerted.

(2) In some embodiments, in the above configuration (1), the axial end surface of the outer ring has the coefficient of static friction or the recess in the entire region of the axial end surface.

According to the above configuration (2), when the outer ring moves in the radial direction relative to the housing within the range allowed by the gap of the oil film damper, the effect of reducing the frictional force between the first axial retaining portion or the first axial retaining portion and the outer ring can be enjoyed over the entire movement range of the outer ring in the radial direction.

(3) In some embodiments, in the above configuration (1), the facing surface that has the coefficient of static friction or the recess extends from a radially inner end of the first axial retaining portion or the second axial retaining portion to a radially outer end of the oil film damper.

According to the above configuration (3), when the outer ring moves in the radial direction relative to the housing within the range allowed by the gap of the oil film damper, the effect of reducing the frictional force between the first axial retaining portion or the second axial retaining portion and the outer ring can be enjoyed from the radially inner end of the first axial retaining portion or the second axial retaining portion to the radially outer end of the oil film damper.

(4) In some embodiments, in any one of the above configurations (1) to (3), the outer ring, or the first axial retaining portion or the second axial retaining portion has a coating film (28, 31) forming the axial end surface or the facing surface.

According to the above configuration (4), since it is relatively easy to form the coating film on the axial end surface or the facing surface, the damping effect of the oil film damper on the shaft vibration can be easily improved.

(5) In some embodiments, in the above configuration (4), the coating film contains amorphous carbon, molybdenum disulfide, carbon nitride, phosphate, nickel phosphorus, silver, cold, or fluororesin.

According to the above configuration (5), with the coating film that contains amorphous carbon, molybdenum disulfide, carbon nitride, phosphate, nickel phosphorus, silver, gold, or fluororesin, it is possible to effectively reduce the coefficient of static friction of the axial end surface or the facing surface.

(6) In some embodiments, in the above configuration (1), at least one of the outer ring, the first axial retaining portion, or the second axial retaining portion contains any of copper, silver, gold, lead, sintered oil-impregnated metal, polyether ether ketone, polyimide, or polyphenylene sulfide.

According to the above configuration (6), since at least one of the outer ring, the first axial retaining portion, or the second axial retaining portion contains any of copper, silver, gold, lead, sintered oil-impregnated metal, polyether ether ketone, polyimide, or polyphenylene sulfide, it is possible to reduce the frictional force acting between the outer ring and the first axial retaining portion, as well as the outer ring and the second axial retaining portion.

(7) In some embodiments, in the above configuration (1), the recess includes a dimple (40A) recessed from the facing surface of the first axial retaining portion or the second axial retaining portion.

According to the above configuration (7), oil supplied from the oil film damper can be held in the dimple included in the facing surface of the first axial retaining portion or the second axial retaining portion. As a result, it is possible to reduce the coefficient of friction of the facing surface of the first axial retaining portion or the second axial retaining portion.

(8) In some embodiments, in the above configuration (1), the recess includes a plurality of first grooves (40B) extending in a radial direction from a radially outer end of the oil film damper to a radially inner end of the first axial retaining portion or the second axial retaining portion.

According to the above configuration (8), since the facing surface of the first axial retaining portion or the second axial retaining portion includes the first grooves, oil supplied from the oil film damper can flow into the first grooves, and the facing surface of the first axial retaining portion or the second axial retaining portion can be further wetted with the oil. As a result, it is possible to reduce the coefficient of friction of the facing surface of the first axial retaining portion or the second axial retaining portion.

(9) In some embodiments, in the above configuration (1), the recess includes a plurality of second grooves (40C) extending in a radial direction from a radially outer end of the oil film damper to a position between the radially outer end and a radially inner end of the first axial retaining portion or the second axial retaining portion.

According to the above configuration (9), since the facing surface of the first axial retaining portion or the second axial retaining portion includes the second grooves, oil supplied from the oil film damper can flow into the second grooves, and the oil can press the axial end surface of the outer ring to reduce the thrust load acting on the outer ring.

REFERENCE SIGNS LIST

1 Turbocharger
2 Compressor
4 Rotational shaft
6 Turbine
8 Bearing
10 Oil film damper
11 Lubricating oil
12 Housing
14 Inner ring
15 Outer peripheral surface of inner ring
16 Outer ring
17 Inner peripheral surface or outer ring
18 Rolling element
19 Raceway surface
20 First axial retaining portion
22 Second axial retaining portion
24 End surface of outer ring on one side in axial direction
26 Facing surface of first axial retaining portion
28 Coating film 30 Radially inner end of first axial retaining portion
31 Coating film
32 Radially outer end of oil film damper
34 Radially outer end of first axial retaining portion
35 Base portion
36 Intermediate member
40 Recess
40A Dimple
40B First groove
40C Second groove
D1 First axial direction
D2 Second axial direction
S Thrust load

The invention claimed is:

1. A turbocharger, comprising:
a rotational shaft;
a rolling-element bearing rotatably supporting the rotational shaft;
an oil film damper disposed radially outward of an outer ring of the rolling-element bearing; and
a housing having a first axial retaining portion and a second axial retaining portion for restricting movement of the outer ring in an axial direction, the first axial retaining portion and the second axial retaining portion being disposed adjacent to both ends of the oil film damper in the axial direction, respectively,
wherein an axial end surface of the outer ring, or a facing surface of the first axial retaining portion or the second axial retaining portion facing the axial end surface of the outer ring:
has a coefficient of static friction smaller than that of a portion of the housing excluding the first axial retaining portion and the second axial retaining portion.

2. The turbocharger according to claim 1,
wherein the axial end surface of the outer ring has the coefficient of static friction in the entire region of the axial end surface.

3. The turbocharger according to claim 1,
wherein the facing surface, which has the coefficient of static friction, extends from a radially inner end of the first axial retaining portion or the second axial retaining portion to a radially outer end of the oil film damper.

4. The turbocharger according to claim 1,
wherein the outer ring, or the first axial retaining portion or the second axial retaining portion has a coating film forming the axial end surface or the facing surface.

5. The turbocharger according to claim 4,
wherein the coating film contains amorphous carbon, molybdenum disulfide, carbon nitride, phosphate, nickel phosphorus, silver, gold, or fluororesin.

6. The turbocharger according to claim 1,
wherein at least one of the outer ring, the first axial retaining portion, or the second axial retaining portion contains any of copper, silver, gold, lead, sintered oil-impregnated metal, polyether ether ketone, polyimide, or polyphenylene sulfide.

7. A turbocharger comprising:
a rotational shaft;
a rolling-element bearing rotatably supporting the rotational shaft;
an oil film damper disposed radially outward of an outer ring of the rolling-element bearing; and
a housing having a first axial retaining portion and a second axial retaining portion for restricting movement of the outer ring in an axial direction, the first axial retaining portion and the second axial retaining portion being disposed adjacent to both ends of the oil film damper in the axial direction, respectively,
wherein an axial end surface of the outer ring, or a facing surface of the first axial retaining portion or the second axial retaining portion facing the axial end surface of the outer ring
has a recess where oil of the oil film damper can enter,
wherein the recess includes a dimple recessed from the facing surface of the first axial retaining portion or the second axial retaining portion, and
wherein the dimple is recessed from a portion of the facing surface that overlaps the axial end surface of the outer ring in a radial direction.

8. A turbocharger, comprising:
a rotational shaft;
a rolling-element bearing rotatably supporting the rotational shaft;
an oil film damper disposed radially outward of an outer ring of the rolling-element bearing; and
a housing having a first axial retaining portion and a second axial retaining portion for restricting movement of the outer ring in an axial direction, the first axial retaining portion and the second axial retaining portion being disposed adjacent to both ends of the oil film damper in the axial direction, respectively, wherein an axial end surface of the outer ring, or a facing surface of the first axial retaining portion or the second axial retaining portion facing the axial end surface of the outer ring:
has a recess where oil of the oil film damper can enter,
wherein the recess includes a plurality of first grooves extending in a radial direction from a radially outer end of the oil film damper to a radially inner end of the first axial retaining portion or the second axial retaining portion, and
wherein at least one of the plurality of first grooves opens a portion of the facing surface that overlaps the axial end surface of the outer ring in the radial direction.

9. The turbocharger according to claim 1,
wherein the recess includes a plurality of second grooves extending in a radial direction from a radially outer end of the oil film damper to a position between the radially outer end and a radially inner end of the first axial retaining portion or the second axial retaining portion.

10. The turbocharger according to claim 8, wherein the dimple is recessed from a portion of the facing surface that overlaps the axial end surface of the outer ring in a radial direction.

11. The turbocharger according to claim 7, wherein at least one of the plurality of first grooves opens a portion of the facing surface that overlaps the axial end surface of the outer ring in the radial direction.

12. The turbocharger according to claim 9, wherein at least one of the plurality of second grooves opens a portion of the facing surface that overlaps the axial end surface of the outer ring in the radial direction.

* * * * *